April 7, 1970 W. F. ILLMAN 3,504,488
SPLICING DEVICE FOR YARNS OR THE LIKE
Filed Dec. 13, 1968 8 Sheets-Sheet 1
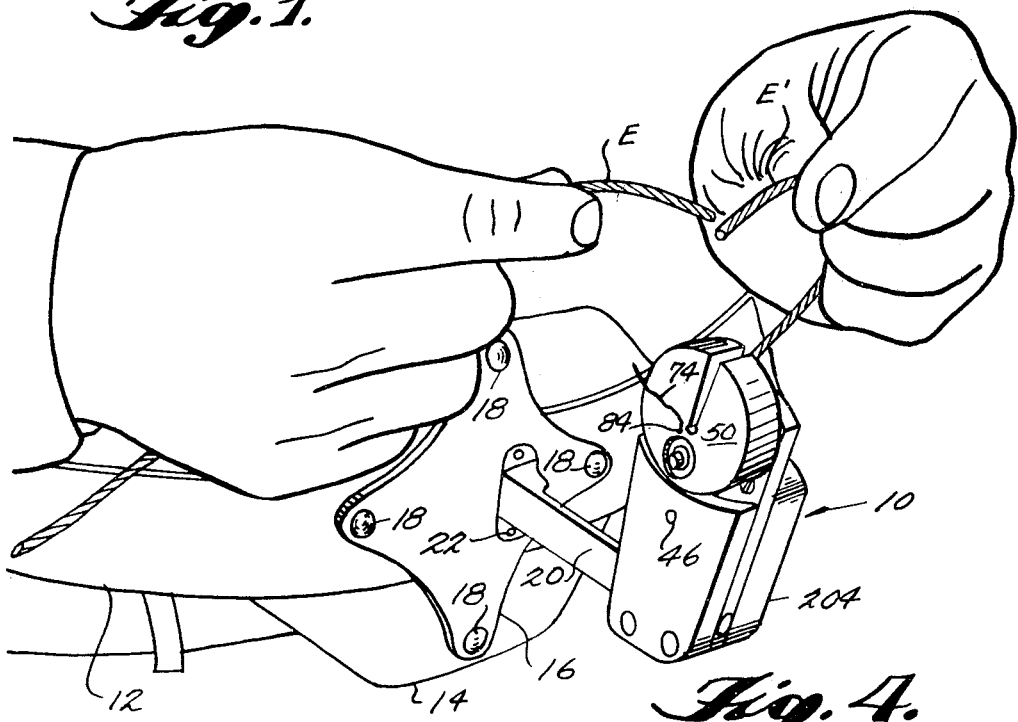
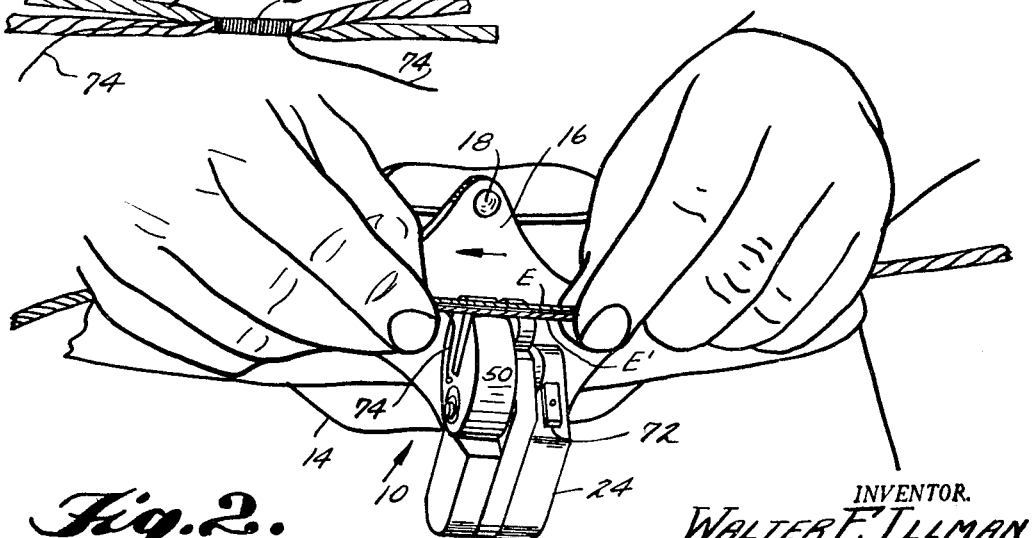
INVENTOR.
WALTER F. ILLMAN
BY
Cushman, Darby & Cushman
ATTORNEYS

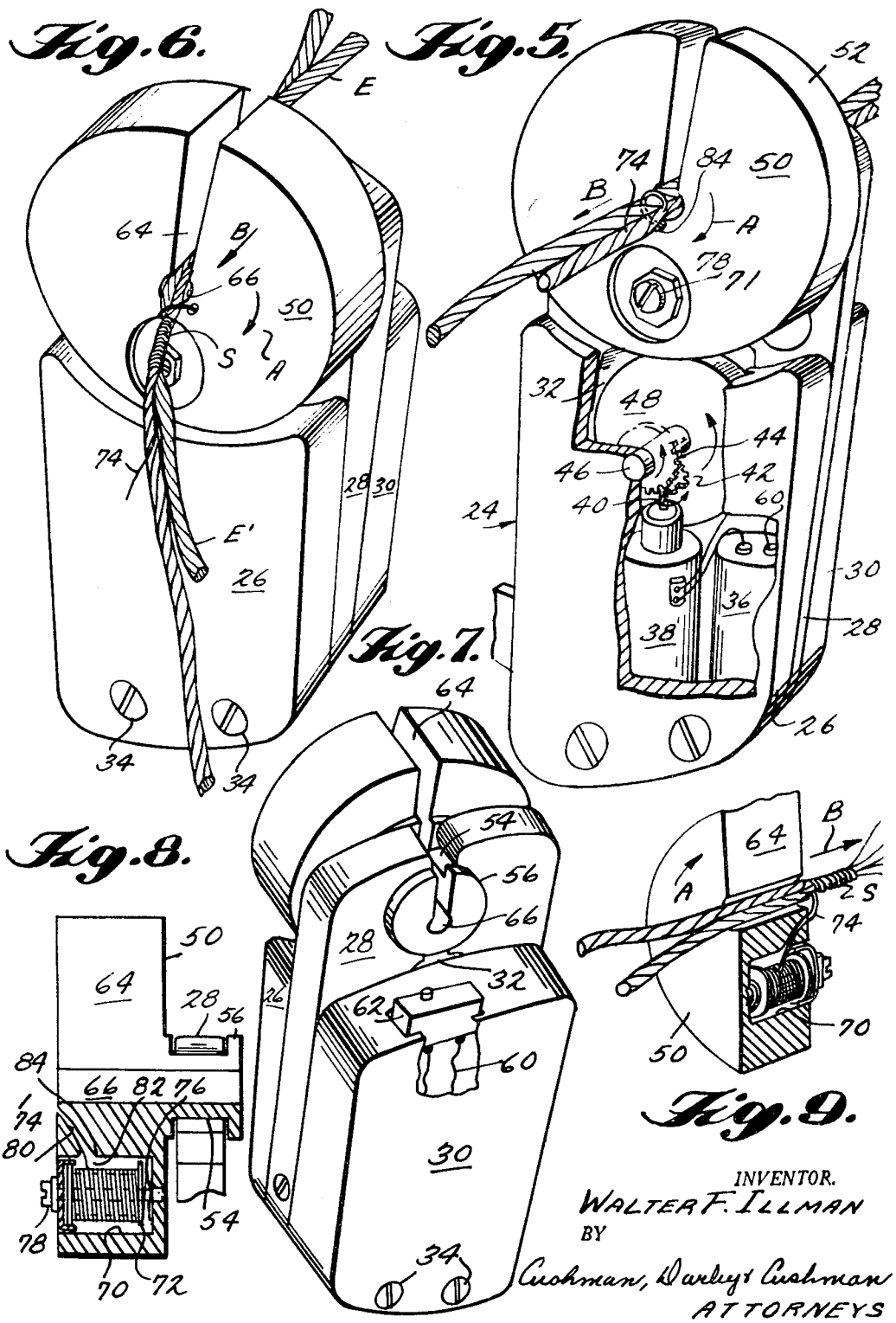

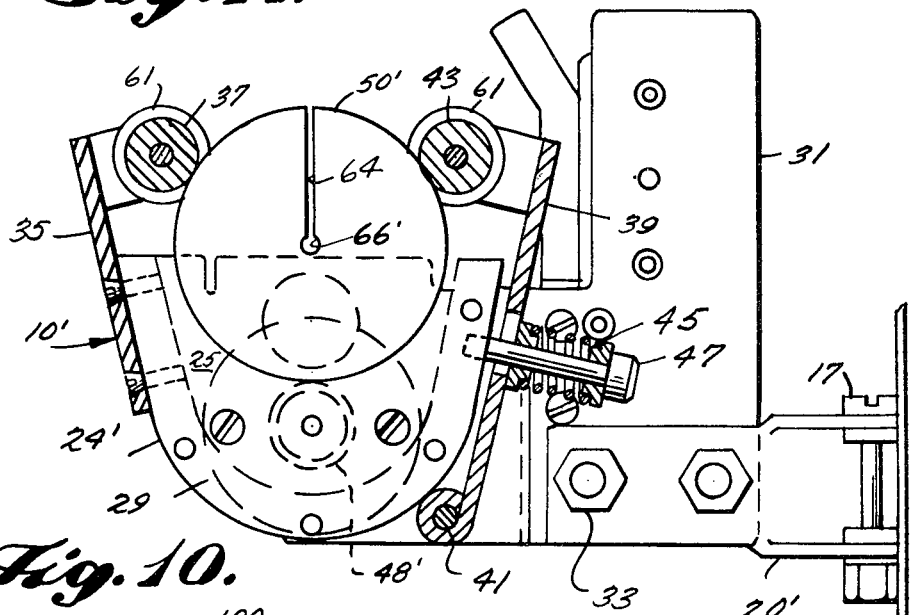
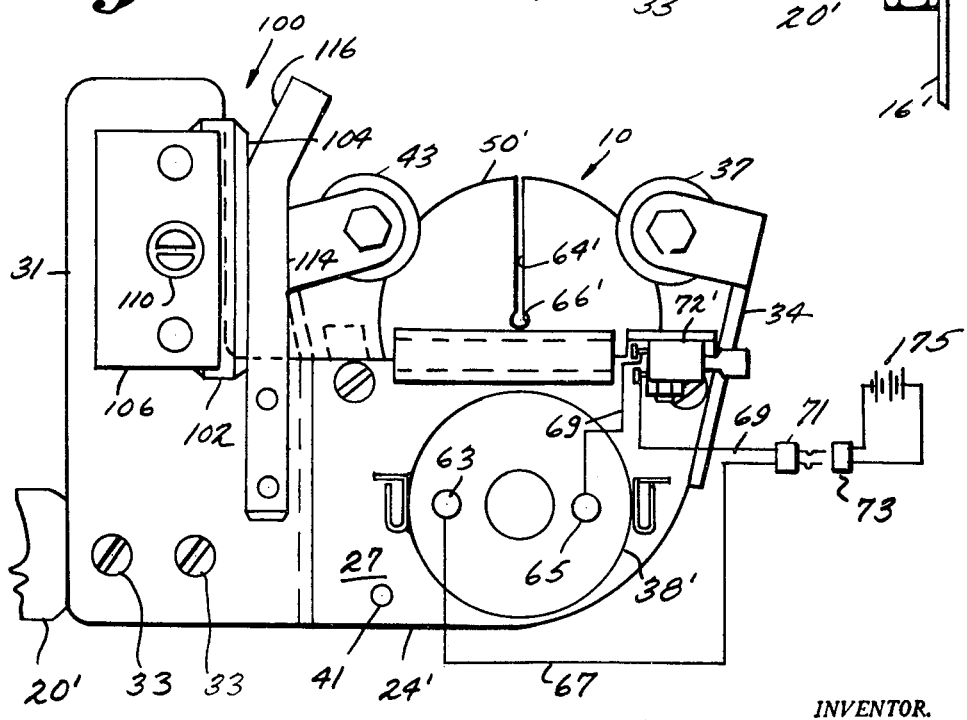

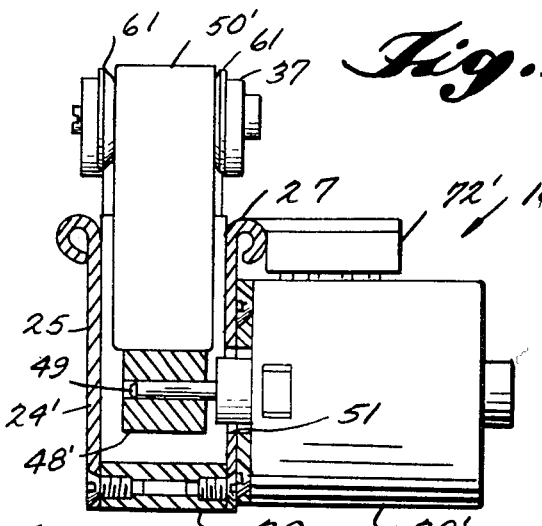
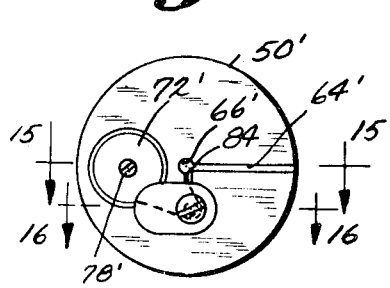
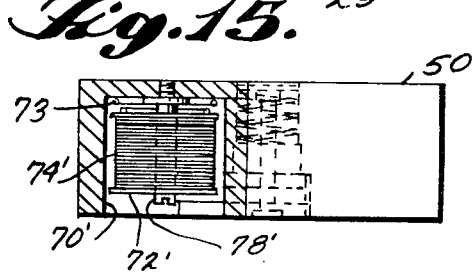
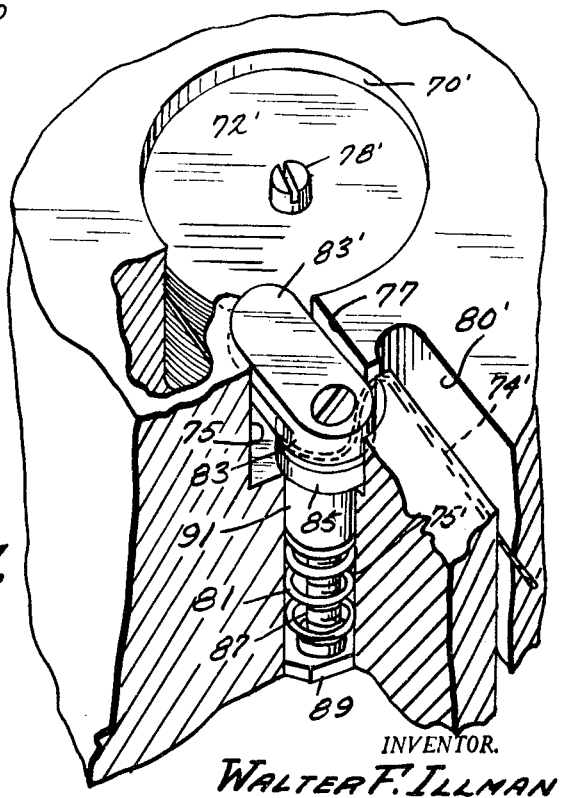

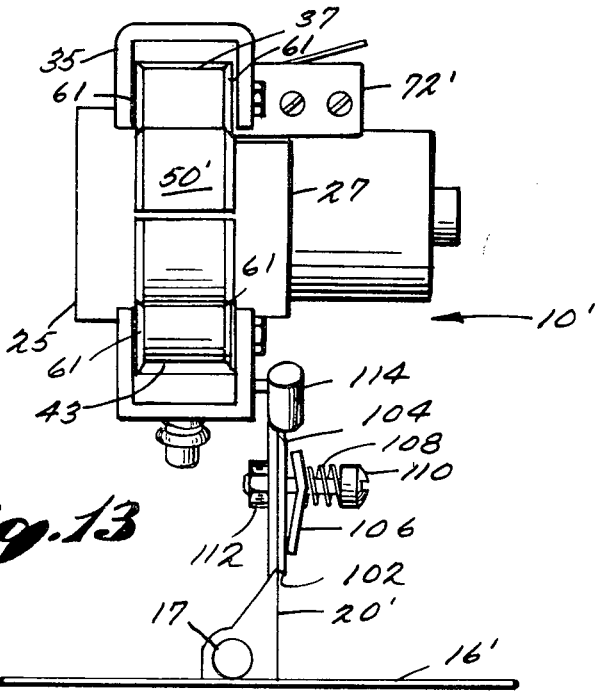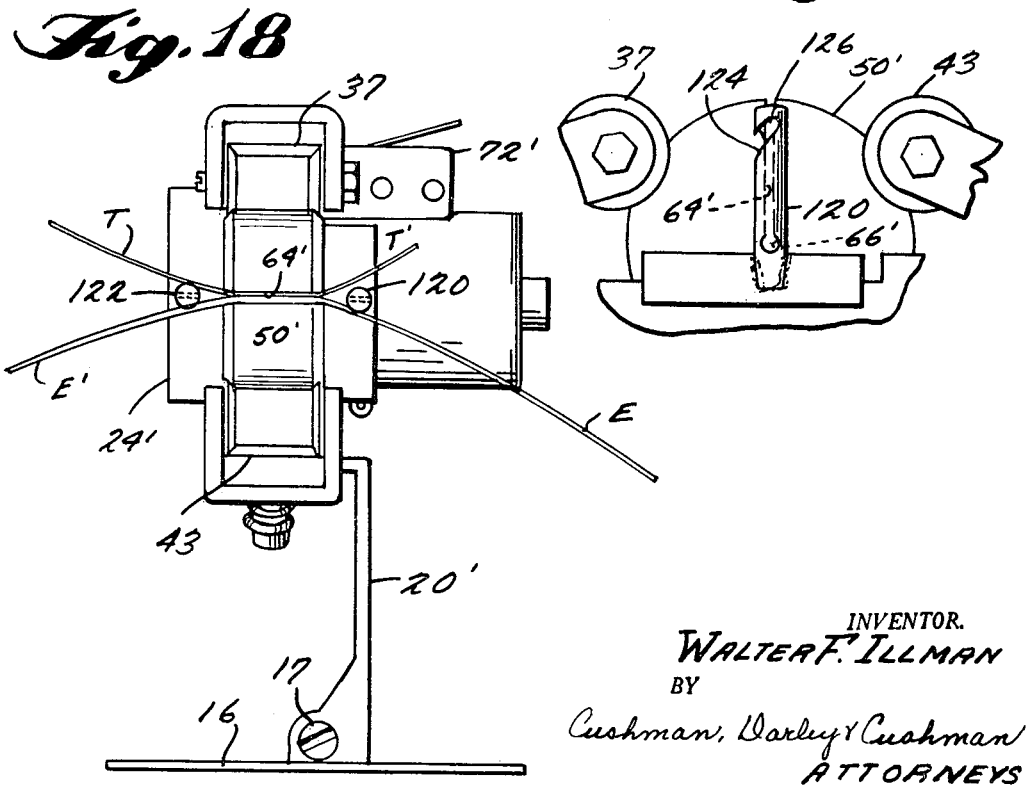

April 7, 1970 W. F. ILLMAN 3,504,488
SPLICING DEVICE FOR YARNS OR THE LIKE
Filed Dec. 13, 1968 8 Sheets-Sheet 6

INVENTOR
WALTER F. ILLMAN
BY Cushman, Darby & Cushman
ATTORNEYS

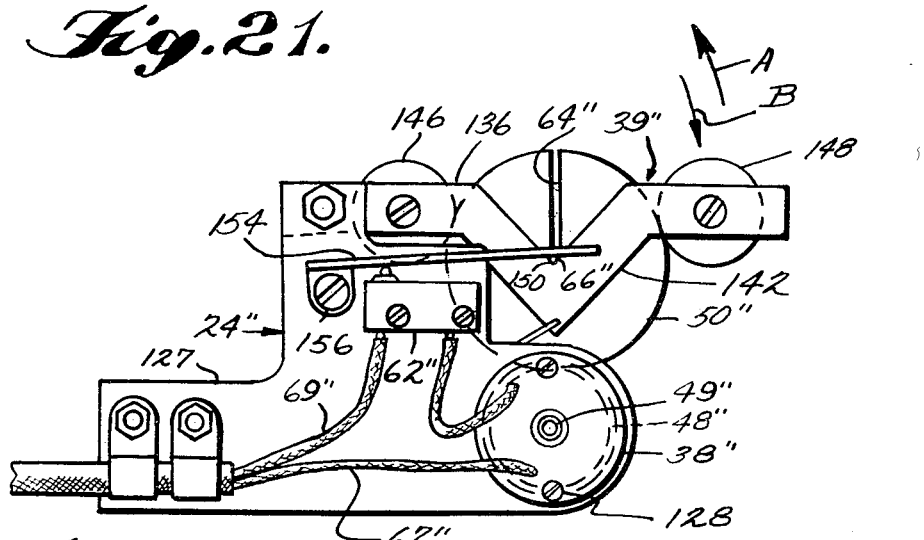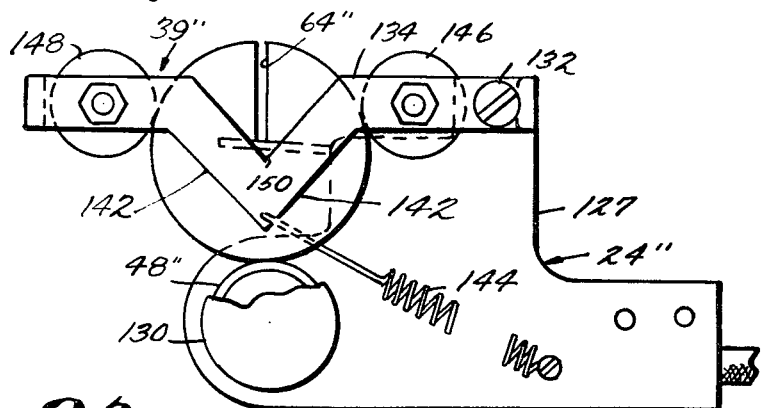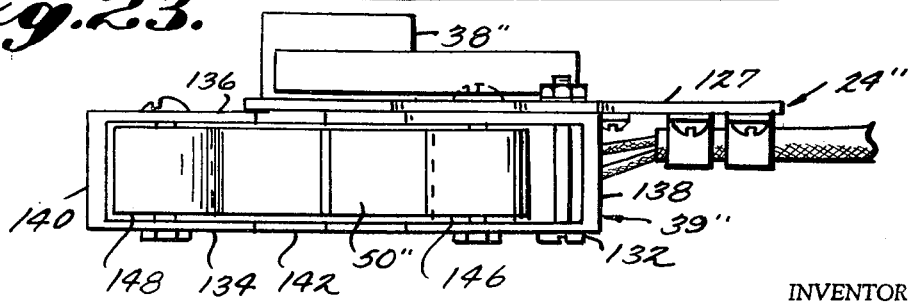

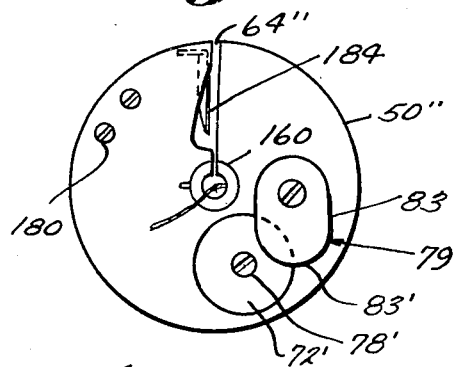
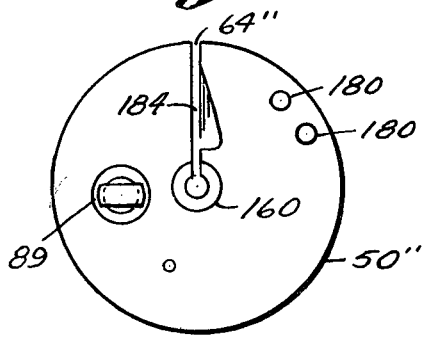
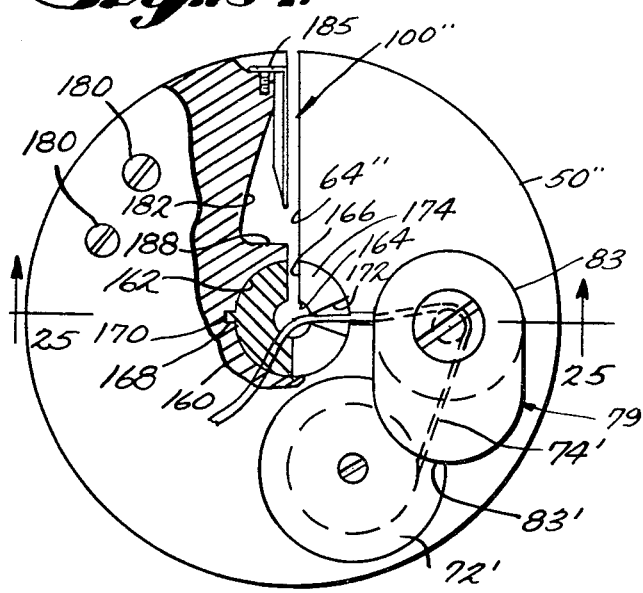
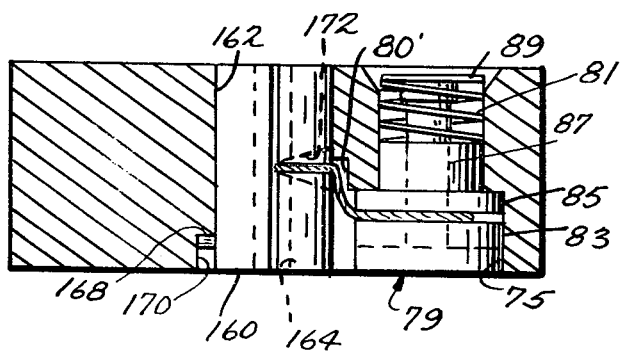

| United States Patent Office | 3,504,488 |
|---|---|
| | Patented Apr. 7, 1970 |

---

3,504,488
SPLICING DEVICE FOR YARNS OR THE LIKE
Walter F. Illman, Greensboro, N.C., assignor to Burlington Industries, Inc., Greensboro, N.C., a corporation of Delaware
Continuation-in-part of application Ser. No. 641,357, May 25, 1967. This application Dec. 13, 1968, Ser. No. 783,470
Int. Cl. D01h 15/00, 17/00
U.S. Cl. 57—22                                                27 Claims

---

ABSTRACT OF THE DISCLOSURE

A splicing apparatus for splicing yarns together, the apparatus including a drum member rotatably supported and carrying a splicing or wrapping thread. The drum member is provided with a yarn passage of sufficient size to receive overlapping ends of yarn to be spliced in parallel side-by-side relationship without rotation of the yarn. When the drum member rotates about the overlapping ends of the yarn, thread carried by the drum member is wrapped about the ends of the yarn to provide a tight splice.

---

This application is a continuation-in-part of my copending application Ser. No. 641,357, filed May 25, 1967 now abandoned.

The present invention relates to an improved apparatus for joining together textile yarns without knotting the same and, more particularly, to an apparatus capable of being worn by an operator, or otherwise suitably mounted so as to leave the operator's hands free to handle the ends of yarns being spliced. Additionally, the apparatus of the present invention provides improved splice for yarns, the splice being easily removable after the yarns are woven into a fabric.

In the manufacturing of textiles there is a frequent need to splice together the ends of various yarns being processed. For example, if there is a break in the yarn being processed or if one supply package of yarn is exhausted and a succeeding supply package of yarn must be joined to the yarn of the first supply package, the two free ends of the yarns must be rejoined to provide continuity to the yarn. Oftentimes the processing must be stopped while the operation of joining the ends of yarn is completed and, hence, any such joining must be accomplished quickly and with a minimum of delay.

Heretofore, the joining of yarns was often accomplished by tying a knot in the free ends of the yarns to be spliced, the knot either being tied by hand or by use of some suitable mechanical equipment designed for the purpose. There are many occasions in the processing of yarns and the manufacturing of textiles when a knot is not desirable. For example, a knot is normally quite bulky in relation to the diameter of the yarn being tied and, thus, with its bulk and its lack of ability to properly flex, the knot will make the yarn vulnerable to being trapped and/or broken as the yarn passes through small eyelets or apertures such as normal reed spacing in the weaving operation. Additionally, knots can be quite objectionable in the finished textile produced as they provide imperfections in the surface of such fabric.

More recently splicing of the ends of yarns together has been accomplished in the manufacture of textiles by utilizing splicing compounds, the splicing compounds being applied to overlapping free ends of the yarns with the rolling of the free ends of the yarns between the fingers, the fingers having been moistened by the splicing compound. This type of splicing has its disadvantages in that first the compound is quite tacky when applied and secondly there is a time delay involved in waiting for the splicing compound to dry. Additionally, when such compound has dried, it oftentimes results in an undesirably hard joint surrounding the yarns, thus preventing this part of the yarns from folding in limp convolutions about other yarns during and/or after weaving. Additionally, the hard dried splicing material oftentimes hangs up on small eyelets, reed dents or the like thus causing the yarn to break. Also, the compound will dye differently.

A third means of splicing yarns has developed over the recent years, this means utilizing a wrapping thread or yarn for wrapping the two ends of yarns together. However, the apparatus which has heretofore been utilized for making this type of splice has been quite cumbersome and stationary thus limiting its adaptability of use at any location in the textile plant or it has had the disadvantage of causing the yarns to be spliced to have a migration or loss of twist at the splice. A migration or loss of twist in the yarns at the vicinity of the splice is quite undesirable as it results in a defect in the ultimate woven product of fabric.

An important object of the present invention is to provide an improved splicing apparatus which may be portable or stationary and which is capable of use on yarns irregardless of whether the yarns are spun from natural fibers, synthetic fibers, animal fibers or mineral fibers. Ancillary to the preceding object, it is a further object of the present invention to provide an improved yarn splicing apparatus in which an operator, may without adjustment to the apparatus, splice any yarn from fine count spun and worsted yarns up to very coarse carpet yarns.

A further object of the present invention is to provide a yarn splicing apparatus which may be worn by an operator or may be stationary, the operator having the ability to quickly splice the ends of yarns with the resulting splice made having flexibility and strength with less bulk at the splice than one of the individual yarns being spliced. Ancillary to the immediately preceding object, it is a further object of the present invention to provide a splicing apparatus in which parallel contiguous ends of yarn are spliced with a wrapping thread or yarn without migration or loss of twist of the yarns regardless of the number of turns in the yarns.

Still another object of the present invention is to provide an apparatus for splicing the ends of yarn together with a wrapping thread or yarn, the apparatus being portable or stationary and the wrapping thread developing high wrapping torque because of the apparatus even though the wrapping thread may not possess high strength properties, yet the resulting splice or joint being as strong or stronger than the strength of the yarns being joined. Additionally, the splice retains the flexibility to a degree similar to the flexibility of the yarns being spliced and, thus, the splice does not interfere with the fold around other yarns of the final woven fabric in which the yarn is used.

A further and still important object of the present invention is to provide an apparatus capable of splicing or joining two yarns with a water soluble wrapping thread as well as providing such a splice or joint whereby the splice will have the property of disappearing from the resultant woven fabric during its wet processing or finishing such as in the regular fabric desizing stage.

Another object of the present invention is to provide an improved splicing apparatus including a rotatable drum member carrying the splicing thread or yarn bobbin, the drum member having an improved tension means for applying a uniform constant tension on the splicing thread or yarn as the splice is being made irregardless of the amount of splicing thread or yarn on the bobbin carried by the drum member.

Ancillary to the preceding objects, it is a further object of the present invention to provide an improved drum member for a splicing apparatus, the drum member having a removable collar provided with yarn passages, the collar also enabling the easy threading of the drum member with the splicing thread or yarn.

Still another object of the present invention is to provide an improved splicing apparatus having cutter means thereon which enable the operator to cut the tails of the yarn spliced as the same is being removed from the drum wrapper apparatus.

These and other objects and advantages of the present invention will appear more fully in the following specification, claims and drawings in which:

FIGURE 1 is a perspective view of the splicing apparatus of the present invention, the same being shown as portable and worn about the waist of an operator with the operator about to insert the ends of the yarns to be spliced into the apparatus;

FIGURE 2 is a further perspective view of the apparatus of the present invention showing the operator grasping the yarn ends between the fingers of the hand, with one hand also grasping the end of the wrapping thread;

FIGURE 3 is a fragmentary view of a splice made on the apparatus of the present invention prior to the clipping of the tails from the ends of yarn as well as the tail of the wrapping yarn;

FIGURE 4 is a view of a completed splice according to the present invention with the tails clipped from the splice;

FIGURE 5 is a perspective view of the apparatus of the present invention, the bracket and belt being omitted, the view being broken away in part to show an alternative modification wherein a self-contained source of power is provided for rotating the drum member of the apparatus;

FIGURE 6 is a view similar to FIGURE 5 but illustrating the making and completion of the splice of the ends of yarns;

FIGURE 7 is a perspective view of the opposite side of the apparatus of FIGURES 5 and 6 and disclosing the mounting of the means selectively operable by the operator for rotating the drum member;

FIGURE 8 is a fragmentary partially sectional view of the drum member of the apparatus and illustrating the mounting of the drum in the housing member as well as the mounting of the bobbin or spool for the wrapping thread;

FIGURE 9 is a fragmentary perspective of the drum partly in section and showing the mounting of the bobbin within the drum member and the forming of a splice;

FIGURE 10 is a side elevational view of a modified form of the apparatus of the present invention, wherein the electric motor is driven from a power supply external to the splicer itself;

FIGURE 11 is a side elevational view of the apparatus of FIGURE 10, the view being taken from the opposite side and having portions thereof shown in section;

FIGURE 12 is an end elevation looking from the left to the right of FIGURE 10, the view showing portions of the apparatus in vertical section;

FIGURE 13 is a top plan view of the apparatus of FIGURE 10;

FIGURE 14 is a side elevational view of the modified drum member shown in the apparatus of FIGURE 10;

FIGURE 15 is a sectional view taken substantially on the line 15—15 of FIGURE 14;

FIGURE 16 is a further sectional view taken substantially on the line 16—16 of FIGURE 14;

FIGURE 17 is a fragmentary enlarged perspective view of the drum of FIGURE 14 and illustrating the path of the wrapping thread from the bobbin;

FIGURE 18 is a top plan view of further modification of the apparatus of the present invention;

FIGURE 19 is an enlarged fragmentary side elevational view of the modification of cutter means illustrated in FIGURE 18;

FIGURE 21 is a side elevational view of a still further modified form of apparatus of the present invention;

FIGURE 22 is a side elevational view of the apparatus of FIGURE 21, the view being taken from the opposite side;

FIGURE 23 is a top plan view of the apparatus of FIGURE 21;

FIGURE 24 is a side elevational view partly in section of a further modified drum member and illustrating an improved cutter means as well as an improved means for threading and feeding the splicing thread or yarn from the center of the drum adjacent to the axis of the drum;

FIGURE 25 is a sectional view of the drum member of FIGURE 24 taken substantially on the line 25—25;

FIGURE 26 is a side elevational view of the drum similar to FIGURE 24 but not illustrating the feed of the splicing thread;

FIGURE 27 is a side elevational view of the drum of FIGURE 26 but taken from the opposite side thereof;

Figure 28:
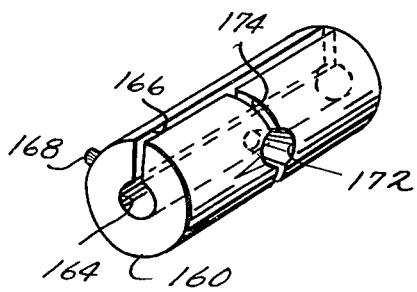
FIGURE 28 is an enlarged perspective view of the removable sleeve or collar member for the drum of FIGURE 24.

Referring now to the drawing wherein like characters or reference numerals represent like or similar parts, the splicing apparatus of the present invention is best disclosed in FIGURES 1 and 2 wherein it is shown as portable and mounted on the waist of an operator. Of course, it will be understood that the apparatus could be stationary and mounted at a fixed location in the plant if so desired or made portable in another manner than by belt support method shown. In more detail, the splicing apparatus of the present invention, which is generally designated by the numeral 10, is provided with a fabric belt 12 extending about the waist of the operator, the belt 12 being provided with an enlarged reinforcing leather member 14. A base plate 16 is attached to the member 14 as well as to the belt 12 by means of rivets 18 or the like. A standard or bracket 20 rigidly secured to the base plate 16 by means of rivets 22 extends outwardly from the base plate and supports at its outer end a housing member 24 of the apparatus 10.

The housing member 24 as best shown in FIGURES 5 and 7 includes three plastic members 26, 28 and 30, the members 26 and 30 providing side walls whereas the member 28 is inverted U-shaped and provides an internal cavity chamber 32 for the housing member. The members 26, 28 and 30 are held together as a unit by means of screws 34 or the like.

Within the cavity 32 of the housing member 24 there is mounted a battery 36 and an electric motor 38. In more detail, the electric motor 38 is provided with a drive shaft 40 having a gear wheel 42 mounted on its upper end. The gear wheel 42 meshes with a beveled gear 44 mounted on a pinion shaft 46 extending through and rotatably supported in the side wall element 26. Also mounted on the pinion shaft 46 is a rubber friction wheel 48, the friction wheel extending outwardly of the housing 24.

A drum member 50 having a periphery 52 is rotatably supported in the intermediate element 28. As best shown in FIGURES 7 and 8 the drum member 50 is provided with an axially extending sleeve 54 having a flanged end 56, the sleeve 54 fitting between the upper ends of the legs of the inverted U-shaped element 28.

Referring back to FIGURE 5, it wil be noted that a suitable wiring circuit 60 is provided between the battery 36 and the electric motor 38. The circuit 60 includes a microswitch 62 carried by the side wall 30, at the upper end thereof, the microswitch 62 being readily accessible to the hands of the operator when forming a splice.

The drum member 50 is provided with a radially extending slot 64, the slot 64 also extending through the sleeve 54 and flange 56. An enlarged axially extending passageway 66 is provided in the drum memer 50 and communicates with the slot 64 at the slot's inner end.

As best shown in FIGURES 8 and 9, the drum member 50 is provided adjacent its periphery in its side with a cavity or chamber 7. A bobbin or spool 72, having a supply of wrapping thread 74 thereon, is rotably in the cavity 70 on an axis parallel to but radially spaced from the axis of rotation of drum member 50 and its passageway 66. In order to provide an adjustable tension on the wrapping thread 74 of the bobbin 72, a spring 76 is interposed between the bobbin 72 and the bottom of the cavity 70 and a screw 78 extending through the bobbin and threadably received in the drum supports the bobbin against this spring. The tighter the screw 78 is screwed into the drum member 50, the more drag or friction is applied to the bobbin 72, thus restricting its tendency to rotate.

A passageway 80 is provided in the drum member 50, the passageway opening at 82 to the cavity 70 as well as at 84 to the exterior of the drum member. It will be noted from FIGURES 8 and 9 that the opening 84 is spaced quite close to but is radially offset from the axis of the drum member so that the wraping thread 74 discharging from the opening will orbit about the ends of yarn to be spliced when the drum member is rotated. This tangential discharge of the wrapping thread 74 about the yarn ends coupled with the drag on the bobbin 72 results in a high torque being applied to the splice even though the wrapping thread may not be particularly strong.

The wrapping thread 74 is made from a water soluble material such as sodium alginate, hydroxyethyl amylose, polyvinyl alcohol, and the like. By making the wrapping thread 74 of a water soluble material, the splice made on the yarn ends may be dissolved out when the woven fabric or the like passes through a wet finishing operation. In other words, the wrapping thread 74 can readily be removed from the splice during any subsequent wet processing of the material woven from the yarn such as a desizing process or the like.

The operation of the splicing apparatus 10 of the present invention may be best understood by referring first to FIGURE 1 through 4 inclusive. As shown in FIGURE 1, the operator takes one end E of yarn in his right hand between the thumb and index finger and another end E' of another piece of yarn in his left hand between his thumb and index finger. The ends E and E' are placed in parallel side-by-side relationship from opposing direction as shown in FIGURE 2 and at the same time the operator also grabs between the thumb and index finger of his right hand the end of the wrapping thread 74 extending out of the opening 84. He then moves the two ends E and E' down into the slot 64 until the ends E and E' rest in the passageway 66 through the drum member 50. Since the switch 62 for causing the drum member 50 to rotate is closely positioned near the thumb and index finger of the left hand, the operator can press the switch and cause the drum member to rotate, for erample, in the direction of the arrow A in FIGURES 5 and 6. Since ends E and E' are mounted on the passageway 66, which is coaxial with the axis of rotation of the drum member 50, the ends E and E' do not twist about one another and therefore the number of turns of the respective yarns being spliced is not mitigated or increased or decreased.

With the wrapping thread 74 tightly grasped against the ends E and E' of the yarns, and with the drum member 50 rotating in the direction of the arrow A, the outlet 84 for the passageway 80 of the wrapping thread 74 orbits about the yarn ends E and E', thus delivering wrapping thread from its bobbin. The operator by moving the yarn ends E and E' simultaneously in the direction of the arrow B of FIGURES 5 and 6, will helically wind the wrapping thread 74 about the two ends E and E' of the yarns to be spliced to form the splice S. Since the wrapping thread 74 comes out of the hole or opening 84 in extremely close proximity to the axially placed parallel pair of ends E and E', a large torque is produced by the wrapping thread 74. This torque can be adjusted by adjusting the drag on the supply package or bobbin 72 of the wrapping thread 74 as heretofore explained. The torque of the wrapping thread 74 is sufficiently great so that the wrapping thread is embedded into the bulky yarns being spliced, the splice S compacting the pair of ends of the yarn to a diameter resembling one of the component yarns. By controlling the amount of movement of the yarn ends in the direction B, the operator can control the length of the splice. The strength of the splice can be increased by reciprocating the yarn ends back and forth in slot along the axis of the drum member 50 as the drum member is rotating.

Referring to FIGURE 3, there is disclosed a finished splice S immediately after the yarns are removed from the drum and the wrapping thread 74 has been severed. It will be noted that the ends E and E' are provided with tails T and T' whereas there are also tails for the wrapping thread 74. The tails for the yarn and for the wrapping thread 74 may then be clipped so that finished joint or splice S will appear as shown in FIGURE 4.

Referring now to FIGURES 10 through 17 inclusive, there is disclosed a modified form of the splicing apparatus 10' of the present invention. In this particular arrangement, apparatus 10' is provided with a bracket 20' secured to a base plate 16' by means of a pivot pin 17. Base plate 16' is connected in any siutable manner to a belt (not shown) adapted to be worn by the operator. The bracket 20' is arranged to support the housing member 24' as best shown in FIGURES 11 and 12. In more detail, the housing 24' includes a pair of spaced end walls 25 and 27 separated by a U-shaped side member 29. The end wall 27 is provided with an upwardly extending flange member 31 to which the end portion of the bracket 20' is attached at the lower portion thereof by means of the bolts and nuts 33. The end walls 25 and 27, together with the U-shaped member 29, define a well or cavity therebetween in which is detachably mounted the drum member 50' as will be explained in more detail below.

U-shaped member 29 has bolted to one of its legs an arm 35, the arm being provided at its upper bifurcated end with a roller 37. A second arm 39 is pivotally connected to the flange 31 by means of a pivot 41, the second arm 39 also having a roller 43 mounted on its upper bifurcated end, the roller 43 opposing the roller 37. Arm 39 and its roller 43 are urged counterclockwise as viewed in FIGURE 11 by means of a spring 45 positioned between the arm 39 and the head of a screw or bolt 47 extending through a hole in the arm and secured to the U-shaped member 29.

Referring now to FIGURES 10 and 12, it will be noted that the wall 27 has secured to outer side of the same an electric motor 38', the motor preferably being of the type disclosed in U.S. Patent No. 2,842,692 issued July 8, 1958, to Johnson et al. or in U.S. Patent No. 2,846,541 issued Aug. 5, 1958, to Evans et al. The drive shaft 49 of the motor 38' extends through an opening 51 provided in the end wall 27, the drive shaft 49 having a friction wheel 48' fixedly mounted directly on the same. As will now be obvious, the drum member 50' can be snapped into and out of position in the housing 24' by pivoting the roller 43 and its arm 39 clockwise as viewed in FIGURE 11.

When the drum member 50' is snapped into position, its periphery will be contacted at three places, namely, by the rollers 37, 43 and the friction drive wheel 48'. Axial movement of the drum member 50' is prevented as the rollers 37 and 43 are grooved so that they are each provided with flanges 61 at their ends. Rotation of the friction wheel or roller 48' by the motor 38' causes rotation of the drum member 50'. When it is desired to replace the drum member 50' with another drum member 50', it is merely necessary to pull upwardly on the drum member and the arm 39 with its roller will pivot out of the way to permit removal and replacement.

The motor 38' which as mentioned above may be of the type shown in either of the aforementioned Johnson et al. and Evans et al. patents, is provided with terminals 63 and 65 to which leads 67 and 69 are connected. The leads extend to a jack plug 71. The lead 69 is provided with switch means 62' suitably supported on the housing at a position accessible to the operator's hand and this enables the operator to selectively start and stop the motor. As shown in FIGURE 10, the jack 71 is arranged to be received in a receptacle 73 connected to a suitable source of electric power 75. In the modification shown in FIGURES 1 to 9 inclusive, the source of electric power is a battery carried by the housing but in the modifications shown in FIGURES 10 through 17, the source of electric power 75 may be an external source such as a separate battery pack carried by the operator or located at a point of use. The source of electric power in the presently preferred form of the invention can be the power in the plant. If the power source is 110 volt AC power, then a transformer and rectifier must be used to convert this power to the lower voltage DC power required by the motor.

Figure 20:
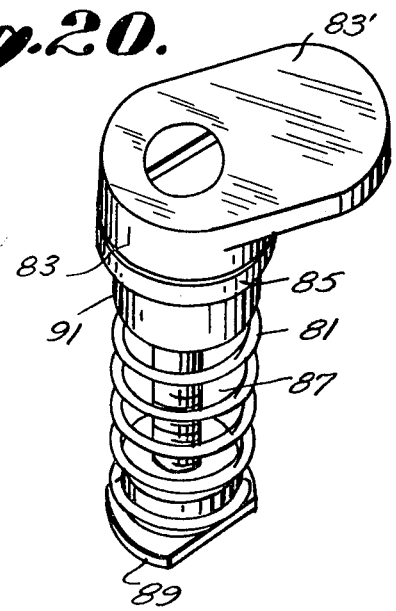
FIGURE 20 is an enlarged perspective view of the tension unit for the drum member of the splicing apparatus illustrated in FIGURES 11 through 19 inclusive and FIGURES 21 to 29 inclusive.

Referring now to FIGURES 14 through 17 inclusive and FIGURE 20, the drum member 50' is provided with a radially extending slot 64' provided with an enlarged axially extending passageway 66' for the ends of the yarn to be spliced. The drum member 50' is also provided with a cavity or chamber 70', which is offset radially from the axial passageway 66'. The cavity 70' has a post 78' carried therein for reception of a bobbin or spool 72' of wrapping thread. Between the bottom of the cavity 70' and the flange of the spool there is provided a spring 73' which normally lightly urges the spool outwardly of the cavity.

Offset from the cavity or chamber 70' as well as from the axial yarn passageway 66', is a second chamber 75 which communicates with the chamber 70' by means of a slot or opening 77. Chamber 75 is arranged to receive a tension unit including a pair of tension disc members 79, the tension disc members 79 being spring urged together by means of a spring 81. In more detail the upper disc member 83 has secured thereto and extending through the lower disc member 85 a screw 87, the screw being threadedly received in a plate 89 at its lower end. The spring 81 between the plate 89 and the shoulder 91 of the lower disc member 85 urges the upper member 83 against the lower disc member. By adjusting the screw 87, the position of the plate 89 is adjusted with respect to the upper disc member 85 and thereby either increases or decreases the force between the disc members as desired to thereby adjust the tension on the wrapping thread. The tension disc members 79 apply uniform constant tension to the wrapping thread irregardless of the amount of thread on the bobbin as tension is applied directly to the thread rather than the bobbin. Consequently, there can be no change in tension resulting from different diameters of the package. It will be noted that the pair of disc members 79 are a unit and are functionally held in a bore 75' frictionally by means of the collar 91.

The tension unit also functions to retain the bobbin 72' in its cavity 70'. In more detail, the upper disc member 83 is provided with a radially extending flange 83' which is arranged to be received in the slot 77. As shown in FIGURES 14 and 17, the flange 83' extends over a portion of the bobbin 72' and thus holds the bobbin on its post 78' against further upward movement by the spring 73'. When it is desired to change the bobbin 72', the flange 83' and disc 83 are moved upwardly against the action of spring 81 and then pivoted out of the way of the bobbin.

A thread passageway 80' open to the side of the drum and to the chamber 75 as well as to the yarn passageway 66' is provided for leading the thread from the tension discs to the area of the passageway 66'. It will be noted that the opening of the passageway 80' to the passageway 66' at 84' (FIGURE 14) is spaced quite close to but is radially offset from the axis of the drum member 50' so that the wrapping thread 74' discharged from the opening will orbit about the ends of the yarn to be spliced when the drum member is rotated. The tangential discharge of the wrapping thread 74' about the yarn ends coupled with the uniform drag on the wrapping thread results in a uniform high torque being applied to the splice even though the wrapping thread may not be particularly strong.

As mentioned hereinbefore, after the splice S is made, the tails T and T' must be cut off close to the splices S. In the apparatus 10' shown in FIGURES 10 through 17 inclusive, cutter means 100 is provided. In more detail, a blade 102, for example, a razor blade having a cutting edge 104 is clamped to the flange 31 by means of a plate member 106. The plate member is spring urged against the blade 102 by means of a spring 108 between the plate member and the head of a screw 110 extending through the plate member and secured to the flange by the nut 112. A guide post 114 having its upper end flared away from the blade 102 as shown at 116 is also secured to the flange 31. The post 116 provides a guide for the tail to be cut as well as a means of protecting the hands of the operator.

Referring now to FIGURES 18 and 19, there is disclosed a still further modification of the apparatus. In this arrangement, instead of providing the cutting means to one side of the housing, a pair of posts 120 and 122 are welded or otherwise suitably secured to the housing 24' in axial alignment with the yarn passageway 64' on each side of the drum member 50'. Each post 64' is provided with an upwardly curved slot 124 on the side of the post facing away from the operator and a small cutter blade 126 is provided in the slot. In operation, the ends E and E' are crossed in an "X" as shown in FIGURE 18 and then are placed side by side in the slot 64' and passageway 66'. The tails T' and T are held away from the operator as shown in FIGURE 18 and the wrapping operation is begun by moving one side of the "X" splice toward one of the posts so that the yarn is wrapped slightly by the wrapping thread just sufficient to hold the splice with modest tension. The tail near the post to which the splice has been moved is then cut by the small blade 126 which is open towards the front away from the operator. The splice is then moved toward the other post and then the other tail is cut. Hence, in the normal course of making the splice, immediately after each tail is cut, the wrapping thread overwraps the ends of the yarn so as to provide a splice without free tails.

The cutter arrangement shown in FIGURES 18 and 19 is particularly adapted for use in splicing heavier yarns of the type used in making carpets from a tufting process. When a splice is made in carpet yarns, the splice must be such that it will still go through the tufting needles and, therefore, the tails must be completely eliminated.

Referring now to FIGURES 21 through 29 inclusive, there is disclosed a still further modification of the splicing apparatus of the present invention. In this arrangement, the housing member 24" is a flat plate element 127 for supporting the electric motor 38" similar to the motor 38', the rotary drum member 50" and the microswitch means 62" for actuating the motor and turning the drum member. The plate element 127 may be suitably mounted on a belt worn by an operator such as the apparatus of FIGURES 1, 10, and 18 or it may be mounted at a fixed position adjacent to its point of use, or provided with a movable stand mount to transport the splicer to a point of use independent of the operator.

In more detail, the motor 38" is mounted by suitable screws 128 to one side of the support plate element 127, the motor having its drive shaft 49" extending through the plate element and supporting on the opposite side of the plate element, the friction drive wheel 48". Friction drive wheel 48" has end flanges 130 spaced apart a distance at least equal to the axial thickness of the drum member 50" so that when the drum member is in operative position it has little or no axial movement. Electrical leads 67" and 69" extending from a suitable source of electric power connect the motor 38" in series with the microswitch means 62", the microswitch means 62" also being mounted on the same side of the plate element 126 as is the motor.

An arm member 39" for supporting the drum member 50" in operative position against the friction drive wheel 48" is pivotally connected by means of a pivot pin 132 to the same side of the plate element 127 from which the friction drive wheel extends, the arm member 39" including a pair of spaced arm elements 134 and 136 separated by end pieces 138 and 140. Each of the arm elements 134 and 136 has a V-shaped center portion 142 which extends toward the friction drive wheel 48" and the arm member 39" is urged toward the friction drive wheel by means of a spring 144 connected to one of the V-shaped center portions 142 and to the plate element 127. Arm member 39" rotatably supports a pair of rollers 146 and 148 between its arm elements 136 and 134, the rollers 146 and 148 being spaced apart from each other a distance less than the diameter of the drum member.

It will now be obvious the arm member 39" can be pivoted counterclockwise as viewed in FIGURE 21 and indicated at A so that the drum member 50" can be slipped between the V-shaped middle portion of the elements 134 and 136 against the rollers 146 and 148 and then the arm member is pivoted downwardly as indicated at B in FIGURE 21 so that the periphery of the drum member is supported by the rollers 146 and 148 against the peripheral surface of the friction drive wheel 48" between its flanges 130.

As clearly shown in FIGURES 21 and 22 at 150, the V-shaped center portion 142 of the arm member 39" extends slightly below the axis of the drum member 50" when the drum member is supported in position and this provides sufficient clearance to place the ends E of the yarn to be spliced into the radially extending slot 64" of the drum member to a position where the ends lie in side-by-side contiguous relationship in the axially extending passage 66" of the drum member. Additionally, the microswitch means 62" is provided with a switch actuator on 154 pivotally secured at 156 to the plate member 127 on the same side as the microswitch means and the motor 38". The switch arm 154 extends in its inactive position to a point just above the axial passageway 66" of the drum member 50" and thus, when a splice is to be made and the ends E of the yarn to be spliced are positioned down into the slot 64" to a position where they lie in the axial passageway 66", they will engage and pivot the actuator arm 154 downwardly, as viewed in FIGURE 21, to close the microswitch means 62" thus energizing the motor 38" and causing rotation of the friction drive wheel 48". Friction drive wheel 48" in turn will rotate the drum member 50" and a splice can be made in a similar manner to that previously described in the specification. The arrangement of the splicing apparatus shown in FIGURES 21 to 23 inclusive permits operation of the drum member 50" without the necessity of the operator actually closing the switch with a portion of his hands and thus permits him to maintain accurate control of the yarn being spliced at all times. Additionally, it will be recognized that if the operator wants to stop the rotation of the drum member 50" at any time during the making of a splice, it is merely necessary for him to release the pressure of the yarn on the switch arm 154 so that the same can swing upwardly.

Referring now to FIGURES 24 to 29 inclusive, there is disclosed details of the improved drum member 50". In some respects the drum member 50" is similar in construction to the drum member 50' although it does have an improved means of threading the same with the wrapping thread from the bobbin 72' as well as improved means for finishing the splice, namely, the provision of cutter means 100" mounted directly thereon. Since the tension unit for the drum member 50" and the mounting of the bobbin is identical as that referred to above with respect to FIGURES 14 through 17 and FIGURE 20, a further description of these elements is not necessary.

The drum member 50" is provided with a removable cylindrically shaped sleeve or collar member 160 which is frictionally held in an enlarged axial bore 162. As will be noted by reference to FIGURES 24, 25 and 28, the collar or sleeve member is provided with a bore 164 therethrough which defines the axial passageway 66" through the drum member 50" when the collar or sleeve is in position. Additionally, the collar or sleeve member 160 is provided with an axially extending radial slot 166 communicating with the bore 162 and which is adapted to align with the radial slot 64" in the drum member. In order to insure that the slot 166 of the collar or sleeve member 160 aligns with the slot 64", the collar or sleeve member is provided with a radially extending pin 168 adapted to fit into a keyway 170 provided in the bore 162.

A radially extending thread passageway or port 172 which is angularly displaced from the slot 166 is provided in the collar or sleeve member 160, the same being adapted to communicate with the bore 164 as well as with the thread passageway 80' in the drum member 50" leading from the chamber 75 in which the tension discs 79 of the tension unit are positioned. A circumferentially extending slot 174 intersecting at least the passageway 172 and the slot 166 extends into the bore 164 and is for the purpose of providing easy threading of the drum 50" as will now be explained in detail.

When it is necessary to thread the drum 50" with wrapping thread 74' from the bobbin 72', the collar or sleeve member 160 is pushed approximately halfway out of the bore 162 until both the passageway or port 172 and the circumferential slot 174 are exposed. The wrapping thread 74', which extends from the bobbin 72' to and between the tension discs 79 in the manner described with respect to FIGURES 14, 15, 16, 17 and 20 is then placed into the passageway 172 through the slot 174 and then outwardly along the bore 164. With the wrapping thread 74' so positioned, the sleeve member 160 is then slid back into its position within the drum member 50" and since the wall of the bore 162 in the drum member covers the slot 174, the only passage for the wrapping thread 74' is directly through the passageway or port 172 to the axial passageway 164. This maintains the discharge of the thread as it is being wrapped around the splice at the true center of the drum, thus resulting in a more controlled splice. In a preferred embodiment, the ledge indicated at 80' in FIGURE 25 would be eliminated, to permit straight feeding of the wrapping yarn to the center bore via passageway 172.

The drum member 50", because of the positioning of the tension discs 79 and the bobbin 72 being off center, must be balanced to avoid vibration when rotating. In order to balance the drum member, weights in the form of screws 180 are suitably positioned to compensate for any out of balance the drum member may have due to the positioning of the bobbin and the tension unit.

Figure 29:
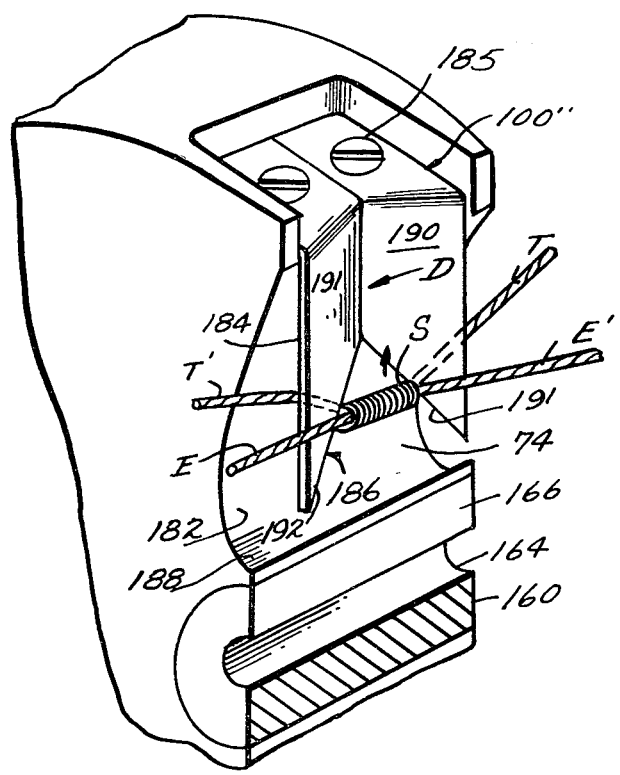
FIGURE 29 is an enlarged perspective views illustrating the finishing of a splice by cutting of the tails.

Referring now specifically to FIGURES 24 and 29, one wall of the radially extending slot 64" is provided with a relief portion therein as indicated at 182, the relief portion sloping away from the radial axis of the slot 64″ as it extends inwardly so as to define an axially extending chamber through the drum member 50″. A cutter means 100″ is provided in this chamber and in effect provides one wall of the slot 64″. In more detail, the cutter means 100″ includes a cutter blade 184 which may be made in two sections 190 and 191 as shown, each suitably supported by a screw 185 or which may be an integral one-piece construction. The cutter blade extends radially inwardly from adjacent the periphery of the drum member 50″. Each section 190 and 191 is provided with a cutting edge 192 and 193 respectively which together define a V-shaped cutting edge 186 facing radially inwardly and terminating just short of an outwardly facing end wall 188 of the cutting chamber 182. There is a slight dihedral to the blade 184 as indicated at D in order to give more exposure of the cutting edges 190 and 191 so that there is a more positive cut of the tails with an avoidance of a cut of the splice.

When the ends E and E′ of the yarn to be spliced are slipped downwardly in the slot 64″ into the yarn passageway 164, the cutter blade 184 which has its cutting edge 186 facing inwardly does not interfere with the normal making of the splice. However, after the splice S has been completed, it being understood that the splice is made in the axial bore 164, the splice is moved upwardly in the slot 166 into the slot 64″. Before the splice S is moved past the tips of the knife edge, tails T and T′ are moved by the operator to a position behind the cutter blade 184 as shown in FIGURE 29. Then further upward movement of the splice S will cause the tails T and T′ to be severed by the V-shaped knife edge 186 of the cutter. The wrapping thread 74′ can be pulled on out of the slot 64″ as the splice S is being pulled out and the operator can then break this off and have a lead of thread extending from the drum member 50″ so that he may utilize it in making of the next splice.

The above-described apparatus for splicing yarns in textile plants eliminates the age-old knot burling operation since there is no fabric deformation by the bulk of the knot or its tails and since the splicing thread is unneeded after the yarn is tight within the woven fabric, the splicing thread can be dissolved out in subsequent fabric treating steps because it is water soluble. Burling, which is removing defects from a piece of cloth, causes a considerable expense annually to a textile manufacturer. If a knot is not burled, a shearing machine will oftentimes cut a hole into the fabric. The present apparatus utilizing water soluble wrapping threads can completely eliminate the need to burl knots.

It will be noted that the spools or bobbins for the supply of wrapping thread contained a sufficient amount of wrapping threads so that the apparatus can be used to make about 800 splices on some yarns. Additionally, an operator can replace the spool easily from the modification shown in FIGURES 1 through 9 inclusive whereas the modifications shown in FIGURES 10 to 29 the entire drum can be replaced, the operator carrying a number of these drum members with him for use during the day. The apparatus of FIGURES 10 through 29 has a further advantage in that an operator can switch from one type of splicing yarn to another type during the course of a day's operation merely by replacing the entire drum member with a bobbin therein, should the type of yarn being spliced dictate the desirability of using a particular water soluble or non-water soluble splicing thread.

The yarn splicing apparatus and the splice made thereby and heretofore described and illustrated in the drawing fully and effectively accomplish the advantages of the present invention. It will be realized that the foregoing specific embodiments disclosed and described illustrate the principles of the invention and are subject to some change without departing from such principles. For example, it is evident that this splicing device can be mounted on a spinning frame coner or winder, directly, or by means of a conveyor device, so that it can be moved into position where it can perform its function. For example, a relatively nonsoluble wrapping material may be preferred in the case of knit goods; whereas a soluble yarn is desirable in the case of woven goods where the weave can bind in the spliced ends. Moreover, changes are contemplated in the wrapping material, which may be of the spun yarn type or may be in film, multifilament or monofilament form. Moreover, the wrapping material may be water soluble as already indicated or may be solvent soluble such as a vinyl acetate material, or may be relatively inert, such as glass which may be desired for certain aerospace uses. Additionally, other forms of motive power are visualized, such as air motors, etc.

Further still, certain apparatus modifications will be recognized as coming within the purview of this invention. One such modification is a timing device that can be mounted close to or distant from the splicer of this invention, to give uniformity to the amount of wrapping performed by permitting the wrapping drive motor to operate for a predetermined period of time. The device constructed for this purpose has been made capable of adjustment, to permit experimental variation of the time cycle, by turning a suitable screw.

What is claimed is:

1. An apparatus for splicing yarns comprising: a housing member; a drum member rotatably supported on said housing member, said drum member having a yarn passage through its axis of a size for receiving overlapping ends of yarn to be spliced in parallel side by side relationship without rotating the same; means for rotating said drum member about the overlapping ends of yarn to be spliced; a source of wrapping thread carried by said drum member; and said drum member having means through which the wrapping thread is fed from its source and is turned about the ends of yarn to be spliced when said drum member is rotated, said last-mentioned means including a thread passageway in said drum member having a discharge opening closely adjacent to but radially offset from the axis of said drum member whereby high torque is applied to the wrapping thread when the same is turned about the yarn.

2. An apparatus as claimed in claim 1 in which said source of wrapping thread includes a bobbin, and in which said drum includes a cavity for receiving said bobbin, means for rotatably supporting said bobbin in said cavity on an axis parallel to the axis of said drum, and means to adjust tension on the wrapping thread.

3. An apparatus as claimed in claim 2 in which said thread passageway through said drum for the wrapping thread is a bore having one end defining said discharge opening and its other end opening to the cavity in said drum for said bobbin.

4. An apparatus as claimed in claim 3 in which said cavity has a closed bottom and said means to adjust tension on the wrapping thread includes a spring between said bobbin and the bottom of the cavity in said drum said spring means.

5. An apparatus as claimed in claim 2 in which said means to adjust tension on the wrapping thread includes tension discs mounted on an axis parallel to and spaced from the axis of said bobbin, the wrapping thread being threaded from said bobbin between said discs and through said thread passageway.

6. An apparatus as claimed in claim 5 in which said thread passageway is opened to the side of said drum to aid in the threading of said wrapping thread.

7. An apparatus as claimed in claim 1 in which said drum member is provided with an axially extending radial slot communicating with the axial passageway in said drum member whereby the ends of the yarn may be slipped into the axial passageway.

8. An apparatus as claimed in claim 1 including cutter means for cutting the tails of the yarn after a splice is made.

9. An apparatus as claimed in claim 8 in which said cutter means is carried by said housing member and includes a cutter blade and a guide post positioned adjacent the cutter blade for guiding the end of yarn to be cut and protecting the operator.

10. An apparatus as claimed in claim 8 in which said cutter means is carried by said housing and includes a pair of posts, each having a cutter blade, one of said posts being positioned adjacent one end of the yarn passageway and the other of said posts being positioned adjacent the other end of said yarn passageway.

11. An apparatus as claimed in claim 8 in which said cutter means is carried by said drum member adjacent said yarn passage whereby tails of the yarn after the splice is made may be cut as the splice is being removed from said drum member.

12. An apparatus as claimed in claim 8 in which said drum member includes a slot extending axially therethrough from the periphery of the drum member to and communicating with said yarn passageway, said slot having one wall provided with a relief portion therein sloping away from the other wall as it extends inwardly, said cutter means including a cutter blade extending inwardly from adjacent the periphery of the drum member and parallel to and spaced from the other wall, said cutter blade having a V-shaped cutting edge at its inner end behind which the tails of the splice made can be positioned so that the same may be severed as the splice is removed from the slot.

13. An apparatus as claimed in claim 1 including means to detachably support said drum on said housing member whereby said drum may be snapped into and out of said housing.

14. An apparatus as claimed in claim 13 in which said support means includes a pair of arms supported on said housing member and having rollers at their outer ends for engaging the periphery of said drum, one of said arms being fixed to said housing and the other of said arms being pivoted to said housing, and spring means to urge said pivoted arm toward said fixed arm.

15. An apparatus as claimed in claim 13 in which said means for rotating said drum member includes a friction drive wheel for engaging the periphery of said drum member, and in which said support means includes an arm member pivotally supported to said housing member, said arm member having a pair of rollers rotatably mounted thereon, said rollers being spaced apart a distance less than the diameter of said drum member, and spring means for urging said arm member to a position wherein said spaced rollers engage the periphery of said drum member and urge the same toward said friction drive wheel.

16. An apparatus as claimed in claim 1 in which said housing member includes a plate element and in which said means for rotating said drum member includes an electric motor carried on one side of said plate element and having a drive shaft extending through said plate element, said drive shaft carrying a friction drive wheel on the other side of said plate element, means to detachably support said drum on the other side of said plate member, said means including an arm member pivoted to said housing member, said arm member rotatably supporting a pair of rollers, said rollers being spaced apart a distance less than the diameter of said drum member, and spring means to urge said arm member and its pair of rollers toward said friction drive wheel whereby said drum member may be supported on its periphery by said pair of rollers and said friction drive wheel.

17. An apparatus as claimed in claim 16 in which said means for rotating said drum member further includes selectively operable means for energizing and deenergizing said electric motor, said selectively operable means being carried by said housing on the same side as said electric motor and positioned to be actuated by placement of overlapping ends of yarn to be spliced in said yarn passage.

18. An apparatus as claimed in claim 1 in which said drum member is provided with an axially extending radial slot communicating with the axial yarn passageway whereby the ends of the yarn may be slipped into the axial passageway, and an axially extending bore; and a sleeve member removably supported in said axially extending bore, said sleeve member having an axially extending bore therethrough defining said axial yarn passage, said sleeve member further having an axially extending radial slot communicating with the bore therein and forming a part of said axially extending radial slot in said drum member, said sleeve member having a radial port angularly displaced from its radial slot, said port defining said discharge opening for said thread passageway positioned substantially at the center of said drum member.

19. An apparatus as claimed in claim 18 in which said sleeve member includes a circumferentially extending slot extending at least between the radial slot in said sleeve member and said port, said circumferentially extending slot being exposed when said sleeve member is partially removed from said drum member to assist in the threading of the drum member with the wrapping thread.

20. An apparatus for splicing yarns, said apparatus being adapted to be worn by an operator, or otherwise suitably positioned, leaving the operator's hand free to handle the ends of the yarns and the end of the wrapping thread and comprising: a housing member; a drum member rotatably supported on said housing member, said drum member having a yarn passageway through its axis of a size for receiving overlapping ends of yarn to be spliced in parallel side-by-side relationship without rotating the same; an electric motor carried by said housing member for rotating said drum member about the over-lapping ends of yarn to be spliced; a source of power for said motor, selectively operable means on said housing for actuating said motor and causing said drum member to rotate, said selectively operable means being accessible to the operator's hands when holding the ends of yarn to be spliced; a source of wrapping thread carried by said drum member; said drum member having means through which the wrapping thread is fed from its source and is turned about the ends of yarn to be spliced when said drum member is rotated, said last-mentioned means including a thread passageway in said drum having a discharge opening closely adjacent to but radially offset from the axis of said drum whereby high torque is applied to wrapping thread when the same is turned about the yarn.

21. An apparatus as claimed in claim 20 in which said source of power includes a battery carried by said housing.

22. An apparatus as claimed in claim 20 in which said source of power includes a battery pack into which leads from said motor can be plugged.

23. An apparatus as claimed in claim 20 in which said electric motor includes a friction wheel engaging the periphery of said drum.

24. An apparatus as claimed in claim 20 including means to support the housing member on the waist of the operator said means including a belt and a bracket attached to said belt and to said housing member.

25. An apparatus for splicing yarns, suitably mounted to leave an operator's hands free to handle the ends of the yarns to be spliced and the end of the wrapping material where necessary and comprising: a housing member; a drum member rotatably supported on said housing member, said drum member having a yarn passageway through its axis of a size for receiving overlapping ends of yarn to be spliced in substantially parallel side-by-side relationship without rotating the same; driving means carried by said housing member for rotating said drum member about the overlapping ends of yarn to be spliced, a source of power for said driving means, selectively operable means on said housing for actuating said driving means and causing said drum member to rotate, said selectively operable means being accessible to the operator's hands when holding the ends of yarn to be spliced; a source of wrapping material carried by said drum member; said drum member having means through which the wrapping material is fed from its source and is turned about the ends of yarn to be spliced when said drum member is rotated, said last-mentioned means including a passageway in said drum having a discharge opening closely adjacent to but radially offset from the axis of said drum whereby high torque is applied to the wrapping material when the same is turned about the yarn ends being spliced.

26. The apparatus of claim 25 mounted above a yarn handling mechanism wherein the source of power is separately mounted with respect thereto, and includes an alternating current power source and a transformer with a power transmitting cable leading to the splicing apparatus.

27. The apparatus of claim 25 mounted above a yarn handling mechanism wherein the source of power is separately mounted with respect thereto, and includes a direct current power source with a power transmitting cable leading to the splicing apparatus.

References Cited
UNITED STATES PATENTS

| | | |
|---|---|---|
| 413,629 | 10/1889 | Phillips. |
| 1,227,716 | 5/1917 | Wenzel. |
| 1,441,561 | 1/1923 | Cook. |
| 3,353,727 | 7/1944 | Howard. |
| 2,971,319 | 2/1961 | Spencer _____ 57—22 |

JOHN PETRAKES, Primary Examiner

U.S. Cl. X.R.

57—159

UNITED STATES PATENT OFFICE
CERTIFICATE OF CORRECTION

Patent No. 3,504,488            Dated April 7, 1970

Inventor(s) Walter Fenwick Illman

It is certified that error appears in the above-identified patent and that said Letters Patent are hereby corrected as shown below:

Column 4, line 33, delete "views" and insert therefor --view--.
Column 5, line 12, delete "memer" and insert therefor --member--
Column 5, line 16, delete "7" and insert therefor --70--.
Column 5, line 17, delete "rotably" and insert therefor --rotatably supported--.
Column 5, line 34, delete "wraping" and insert therefor --wrapping--.
Column 6, line 40, delete "siutable" and insert therefor --suitable--.
Column 12, claim 4, line 57, after "drum" insert --and screw means adjustably supporting the bobbin against--.

Signed and Sealed this

Twenty-sixth Day of April 1977

[SEAL]

Attest:

RUTH C. MASON
*Attesting Officer*

C. MARSHALL DANN
*Commissioner of Patents and Trademarks*